(12) United States Patent
Li

(10) Patent No.: US 6,726,233 B1
(45) Date of Patent: Apr. 27, 2004

(54) TODDLER TRICYCLE FOLDING FOOTBOARD STRUCTURE

(75) Inventor: Hsing Li, Taichung (TW)

(73) Assignee: Hong Mou Enterprise Co., LTD, Taichung (TW)

(*) Notice: Subject to any disclaimer, the term of this patent is extended or adjusted under 35 U.S.C. 154(b) by 0 days.

(21) Appl. No.: 10/265,139

(22) Filed: Oct. 7, 2002

(65) Prior Publication Data
(65)

(51) Int. Cl.⁷ .............................................. B62J 25/00
(52) U.S. Cl. ........................ 280/291; 280/282; 280/7.17
(58) Field of Search ................................ 280/291, 282, 280/62, 7.17, 304.3, 304.4, 87.01, 639, 293, 295, 288.4; 180/210; D12/112, 113, 121; 297/30, 423.1

(56) References Cited

U.S. PATENT DOCUMENTS

| | | | | |
|---|---|---|---|---|
| 4,457,529 A | * | 7/1984 | Shamie et al. | 280/278 |
| 5,028,066 A | * | 7/1991 | Garth | 280/282 |
| 6,089,587 A | * | 7/2000 | Li | 280/291 |
| 6,161,847 A | * | 12/2000 | Howell et al. | 280/30 |
| 2003/0122346 A1 | * | 7/2003 | Wu | 280/291 |
| 2003/0201621 A1 | * | 10/2003 | Jang | 280/293 |

FOREIGN PATENT DOCUMENTS

| | | | | |
|---|---|---|---|---|
| JP | 10119860 A | * | 5/1998 | B62K/9/02 |
| JP | 11263273 A | * | 9/1999 | B62L/1/08 |

* cited by examiner

*Primary Examiner*—Lesley D. Morris
*Assistant Examiner*—Daniel Yeagley
(74) *Attorney, Agent, or Firm*—Rabin & Berdo, P.C.

(57) ABSTRACT

A toddler tricycle folding footboard structure consisting of a shaft hole formed through the lateral surfaces of a connective tube positioned between the rear and front brace of a toddler tricycle frame that is aligned with the shaft holes in the vertical extremities of a pair of L-shaped bracket members, a bolt inserted through the shaft holes, and a nut fastened onto it to effect a tight conjoinment, following which the pair of L-shaped bracket members remain movable at the shaft hole in the lateral surfaces of the connective tube. The horizontal extremities at the bottom aspects of the L-shaped bracket members facing outward from the two sides of the connective tube are then conjoined to a footboard such that they become a unitary structural entity, with the bolt functioning as an axle that enables free swinging for folding and unfolding to reduce space occupancy and facilitate utilization convenience.

2 Claims, 4 Drawing Sheets

TODDLER TRICYCLE FOLDING FOOTBOARD STRUCTURE

BACKGROUND OF THE INVENTION

1) Field of the Invention

The invention herein relates to a toddler tricycle folding footboard structure consisting of a pair of L-shaped bracket members that are coupled to the lateral surfaces of a connective tube positioned between the rear brace and the front brace of a toddler tricycle frame and have free swinging capability for folding and unfolding to reduce space occupancy and facilitate utilization convenience.

2) Description of the Prior Art

Conventional vehicles for very young children such as toddler tricycles typically consist of an axle disposed proximal to the two ends of a U-shaped construct at the rear brace of a toddler tricycle frame such that a wheel is installable on each of the two extremities of the axle penetrating the U-shaped construct and, furthermore, a support plate situated over the axle that provides for the placement of a carrying basket, with the support plate having threaded holes that are aligned with mounting holes in the carrying basket, following which screws are inserted through the mounting holes and fastened into the threaded holes to thereby attach the carrying basket over the rear brace of the frame and provide for the placement of toddler toys; if a carrying basket is not installed, an assistive handle is insertionally positioned in the U-shaped construct that provides for the pushing of the toddler tricycle by an adult from the rear of the toddler tricycle and, furthermore, a handlebar structure is movably coupled to the two ends of a connective tube at a front brace of the frame to provide for steering control, with a front wheel installed on an axle through its bottom tips and a pedal crankarm disposed on each of the two extremities of the said axle that facilitates the rotation of the front wheel by treadling the pedals utilizing both feet and enables the forward movement of the toddler tricycle, and a soft saddle situated on the upper extent of the connective tube that provides for comfortable sitting.

When a child is seated on the toddler tricycle and riding it, the pedals on the said pair of crankarms are treadled for self-powered forward movement or an adult can push the toddler tricycle forward by means of the assistive handle insertionally positioned in the. U-shaped construct at the rear of the toddler tricycle, at which time the two feet of a child should not treadle the crankarm pedals to avert accidental injury from lower limb impact or entrapment due to the pedals on the said pair of crankarms that revolve synchronously as the front wheel rotates, the adult then ensuring that both feet of the child are postured gently on the pedals for greater safety and peace of mind; as such, the lower limbs do not end up dangling in the air at the two sides of the toddler tricycle because no area is available for foot placement and, furthermore, the two feet of a child rest quite comfortably on the pedals and given the natural playfulness of children at that early age, the child tends to remain seated and not as restless; however, although the two feet are less likely to move back and forth within the impact and entrapment range of the pair of crankarms and pedals, attention is still required to avoid situations that result in such lower limb injuries.

Such structural designs pose significant hazards for children at play and result in unsafe and highly dangerous toddler tricycle structures.

In view of the shortcomings of the prior art., since the applicant conducted extensive research, improvement and innovation that was later verified and, furthermore, ensured to have increased practicality, the present invention is submitted for application.

SUMMARY OF THE INVENTION

The primary objective of the invention herein is to provide a toddler tricycle folding footboard structure consisting of a shaft hole formed through the lateral surfaces of a connective tube positioned between the rear brace and the front brace of a toddler tricycle frame that is aligned with the shaft holes in the vertical extremities of a pair of L-shaped bracket members, a bolt inserted through the said shaft holes, and a nut fastened onto it to effect a tight conjoinment, following which the, said pair of L-shaped bracket members remain movable at the shaft hole in the lateral surfaces of the connective tube; the horizontal extremities at the bottom aspects of the said L-shaped bracket members facing outward from the two sides of the connective tube are then conjoined to a footboard such that they become a unitary structural entity, with the bolt functioning as an axle that enables free swinging for folding and unfolding to reduce space occupancy and facilitate utilization convenience, allowing an adult to place both feet of the child onto the footboard to thereby push the toddler tricycle into motion with greater safety and peace of mind since the lower limbs do not end up dangling in the air at the two sides of the toddler tricycle because no area is available for foot placement; additionally, the two feet of a child rest quite comfortably on the footboard and given the natural playfulness of children at that early age, the child tends to remain seated and not as restless; however, although the two feet are less likely to move back and forth within the impact and entrapment range of the pair of crankarms and pedals, attention is still required to prevent situations that result in such lower limb injuries.

To enable a further understanding of the improved structure and other items of the pre sent invention for purposes of review and reference, the brief description of the drawings below are followed the detailed description invention.

BRIEF DESCRIPTION OF THE DRAWINGS

FIG. 2-B is a cross-sectional drawing of the said structure.

DETAILED DESCRIPTION OF THE INVENTION

Figure 1:
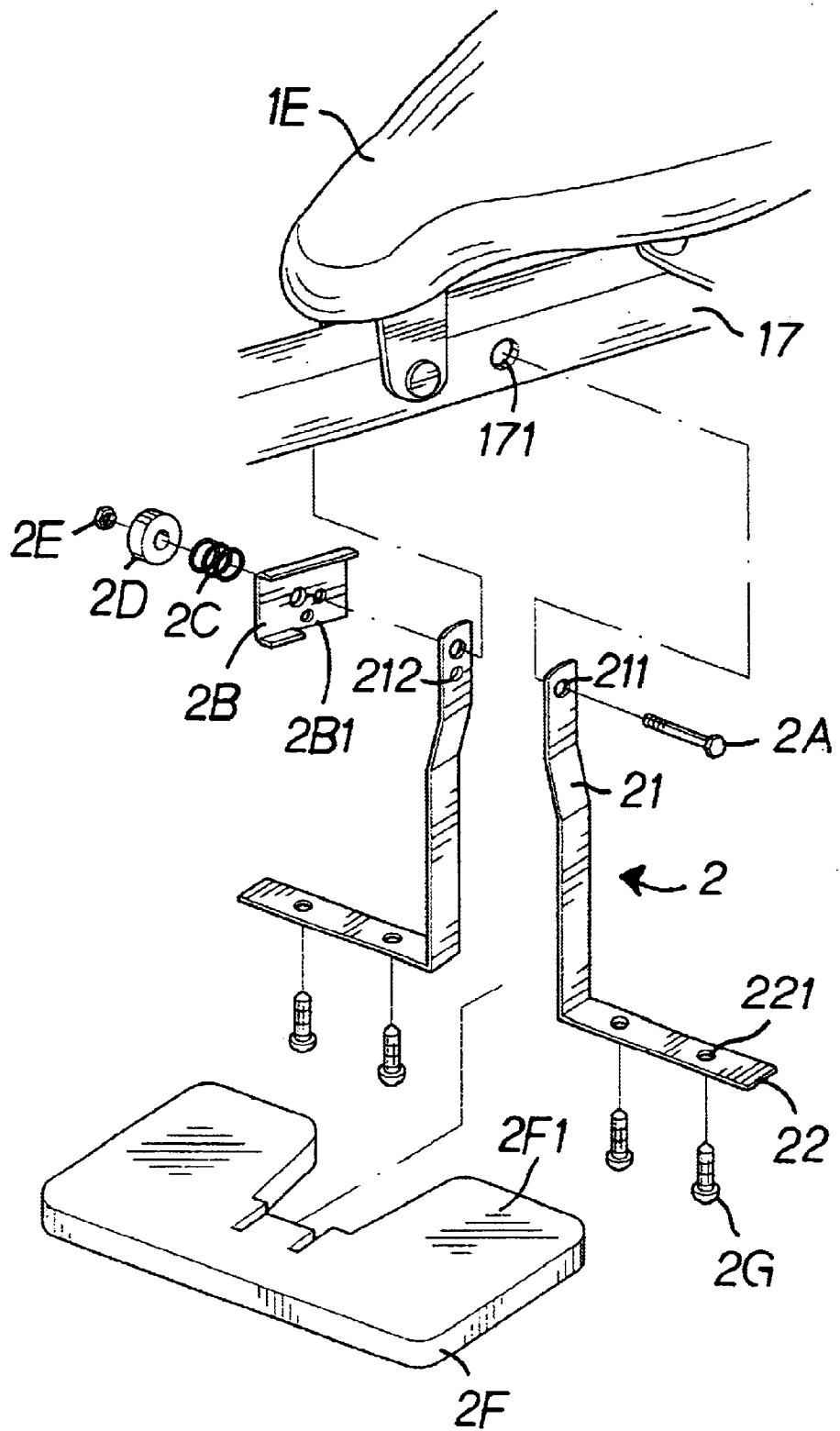
FIG. 1 is exploded drawing of a portion of the structure of the invention herein.
Figure 2:
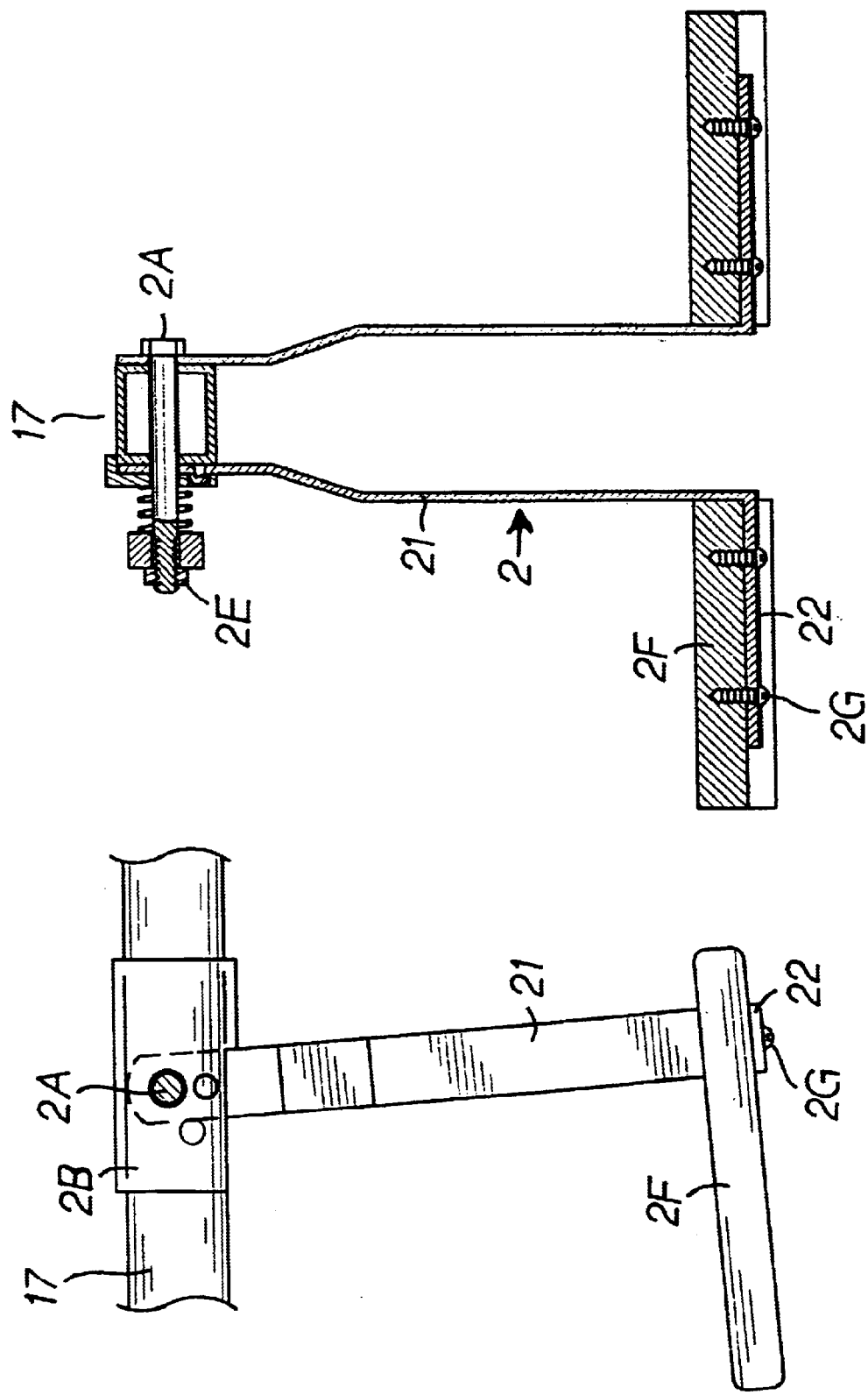
FIG. 2-A is an orthographic drawing of the said structure.
Figure 3:
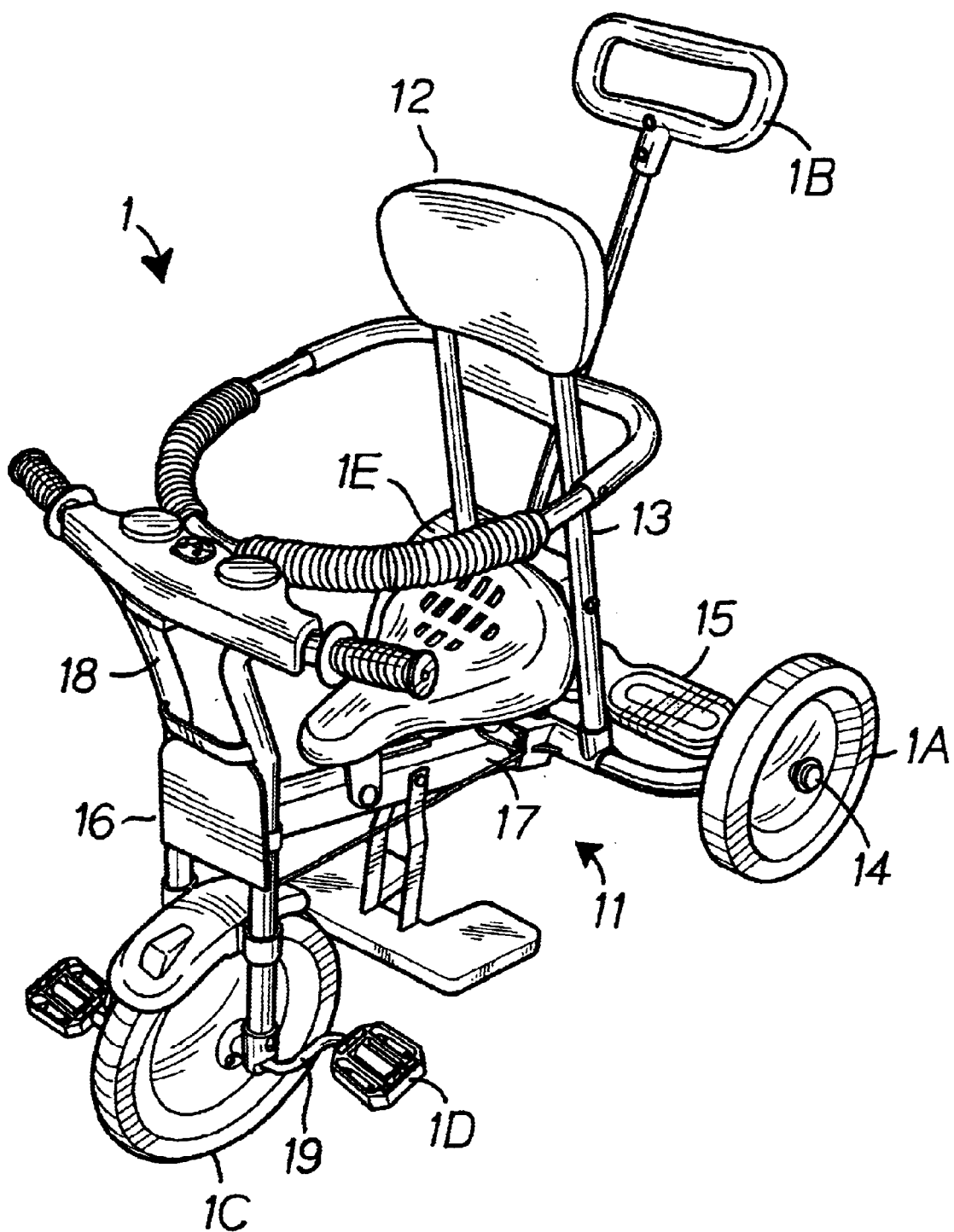
FIG. 3 is an isometric drawing of the invention herein.

Referring to FIG. 1, FIG. 2-A, FIG. 2-B, and FIG. 3, the toddler tricycle folding footboard structure of the invention herein consists of an axle 14 disposed proximal to the two ends of a U-shaped construct 13 at the rear brace 12 of a toddler tricycle 1 frame 11 such that a wheel 1A is installable on each of the two extremities of the axle 14 penetrating the U-shaped construct 13 and, furthermore, a support plate 15 situated over the axle 14 that provides for the placement of a carrying basket, an assistive handle 1B insertionally positioned in the U-shaped construct 13 that provides for the pushing of the toddler tricycle 1 by an adult from the rear of the toddler tricycle 1 and, furthermore, a handlebar structure 18 movably coupled to the two ends of a connective tube 17 at a front brace 16 of the frame 11 that provides for steering control, with a front wheel 1C installed on an axle through its bottom tips and a pedal 1D crankarm 19 disposed on each of the two extremities of the said axle that facilitates the rotation of the front wheel C1 by treadling the pedals 1D utilizing both legs and enables the forward movement of the toddler tricycle 1, and a soft saddle 1E situated on the upper extent of the connective tube 17 that provides for comfortable sitting.

A shaft hole 171 is formed through the lateral surfaces of the connective tube 17 positioned between the rear brace 12 and the front brace 16 of the toddler tricycle 1 frame 11 that is aligned with the shaft holes 211 in the vertical extremities 21 of a pair of L-shaped bracket members 2; a bolt 2A is inserted through the shaft holes 171 and 211, and following the respective sleeving of a lock plate 2B, a spring 2C, and a washer 2D on the projecting portion of the said bolt 2A, a nut 2E is fastened to effect a tight conjoinment, while the said pair of L-shaped bracket members 2 remain movable at the shaft hole 171 in the lateral surfaces of the connective tube 17 such that horizontal extremities 22 at the bottom aspects of the said L-shaped bracket members 2 facing outward from the connective tube 17 pivot at the two sides of the connective tube 17, with the bolt 2A functioning as an axle that enables free swinging for folding and unfolding to reduce space occupancy and facilitate utilization convenience; a plurality of holes 221 are formed through the horizontal extremities 22 at the said bottom aspects to provide for straddling the planar surfaces 2F1 projecting from the two ends inside a footboard 2F and the respective insertion of screws 2G into the plurality of holes 221 and through the back surfaces of the horizontal extremities 22 to fasten them to the footboard 2F such that the footboard 2F and the L-shaped bracket member 2 horizontal extremities 22 are conjoined into a unitary structural entity; and a pair of locating holes 2B1 are formed through the lock plate 2B to provide for the entry of pins 212 protruding from the exterior sides of the L-shaped bracket member 2 vertical extremities 21 thereby enabling the said pair of L-shaped bracket members to remain firmly postured in the unfolded and folded state without flexing.

Figure 4:
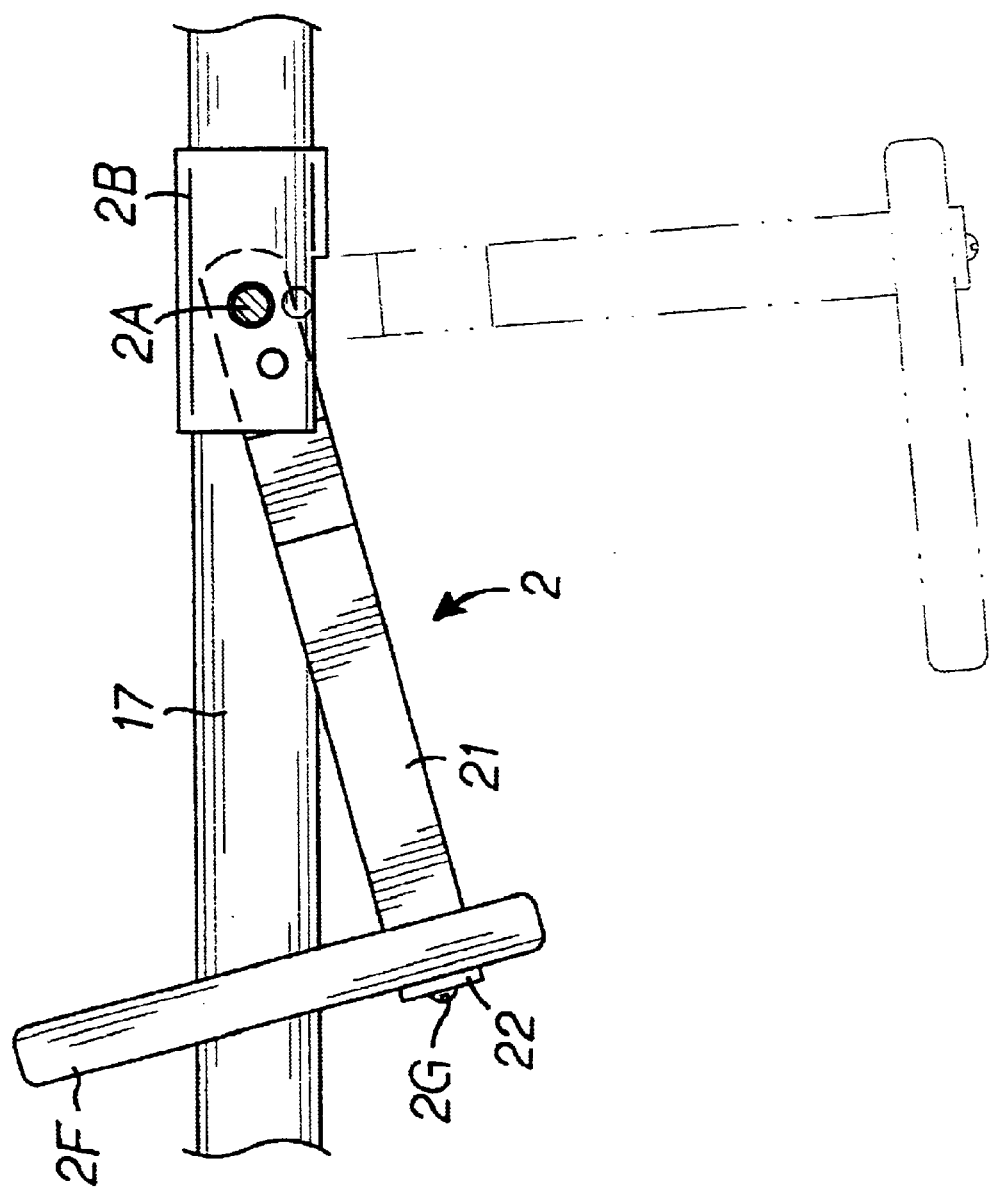
FIG. 4 is an orthographic drawing of the most preferred embodiment of the invention herein.

Referring to FIG. 4, the insertion of the bolt 2A through the pair of L-shaped bracket members 2 and the connective tube 17 shaft hole 171 and its fastening into position by the nut 2E is such that the said pair of L-shaped bracket members 2 are movable at the shaft hole 171 in the lateral surfaces of the connective tube 17 and the bolt 2A functions as an axle that enables free swinging for folding and unfolding to reduce space occupancy and facilitate convenient usage; when an adult pushes the toddler tricycle 1 forward by means of the assistive handle 1B insertionally positioned in the U-shaped construct 13 at the rear of the toddler tricycle 1, the two feet of a child should not treadle the crankarm 19 pedals 1D to avert accidental injury from lower limb impact or entrapment due to the pedals 1D on the said pair of crankarms 19 that revolve synchronously as the front wheel 1C rotates, the said pair of L-shaped bracket members 2 are freely swung into the unfolded state by pivoting on the bolt 2A that enables them to be movably situated at the shaft hole 171 in the lateral surfaces of the connective tube 17 such that the footboard 2F conjoined to the L-shaped bracket member 2 horizontal extremities 22 into a unitary structural entity is horizontally positioned, allowing the adult to place both feet of the child onto the footboard 2F to thereby push the toddler tricycle 1 into motion with greater safety and peace of mind; as such, the lower limbs do not end up dangling in the air at the two sides of the toddler tricycle 1 because no area is available for foot placement and, furthermore, the two feet of a child rest quite comfortably on the footboard 2F and given the natural playfulness of children at that early age, the child tends to remain seated and not as restless; however, although the two feet are less likely to move back and forth within the impact and entrapment range of the pair of crankarms 19 and pedals 1D, attention is still required to avert situations that result in such lower limb injuries.

Additionally, when a child is seated on the toddler tricycle 1 as it is being ridden, the said pair of L-shaped bracket members 2 swung into the unfolded state by pivoting them on the bolt 2A can be swung in the opposite direction into the folded state to reduce space occupancy as well as enable the treadling of the pedals 1D on the said pair of crankarms 19 for self-powered forward movement.

In summation of the foregoing section, since the invention herein improves upon the inconveniences of the prior art and, furthermore, is capable of performance as claimed, the present invention meets new patent application requirements and is lawfully submitted to the patent bureau for review and granting of the commensurate patent rights.

What is claimed is:

1. A toddler tricycle folding footboard structure consisting of a shaft hole formed through the lateral surfaces of a connective tube positioned between a rear brace and a front brace of a toddler tricycle frame that is aligned with shaft holes in the vertical extremities of a pair of L-shaped bracket members; a bolt inserted through the said shaft holes, and following the respective sleeving of a lock plate, a spring, and a washer on the projecting portion of the said bolt, a nut is fastened to effect a tight conjoinment, while the said pair of L-shaped bracket members remain movable at the said shaft hole in the lateral surfaces of the said connective tube such that horizontal extremities at the bottom aspects of the said L-shaped bracket members facing outward from the said connective tube pivot at the two sides of the said connective tube, with the said bolt functioning as an axle that enables free swinging for folding and unfolding to reduce space occupancy and facilitate utilization convenience; and a plurality of holes formed through the said horizontal extremities at the said bottom aspects that provide for straddling planar surfaces projecting from the two ends inside a footboard and the respective insertion of screws into the said plurality of holes and through back surfaces of the said horizontal extremities to fasten them to the said footboard such that the said footboard and the said L-shaped bracket member horizontal extremities are conjoined into a unitary structural entity.

2. As mentioned in claim 1 of the toddler tricycle folding footboard structure of the invention herein, the said lock plate has a pair of locating holes to provide for the entry of pins protruding from the exterior sides of the said L-shaped bracket member vertical extremities, thereby enabling the said pair of L-shaped bracket members to remain firmly postured in the unfolded and folded state without flexing.

* * * * *